United States Patent [19]

Adachi et al.

[11] Patent Number: 5,789,480
[45] Date of Patent: Aug. 4, 1998

[54] METHOD FOR THE PREPARATION OF ONE-PACKAGE ROOM-TEMPERATURE-CURABLE SILICONE COMPOSITIONS

[75] Inventors: Hiroshi Adachi; Toshio Saruyama; Shigeki Sugiyama; Itsuo Toyoda, all of Chiba Prefecture, Japan

[73] Assignee: Dow Corning Toray Silicone Co., Ltd., Tokyo, Japan

[21] Appl. No.: 622,294

[22] Filed: Mar. 27, 1996

[30] Foreign Application Priority Data

Mar. 31, 1995 [JP] Japan ................................. 7-099500

[51] Int. Cl.$^6$ ........................................................ C08K 3/36
[52] U.S. Cl. ............................ 524/863; 524/864; 528/34
[58] Field of Search ..................................... 524/863, 864; 528/34

[56] References Cited

U.S. PATENT DOCUMENTS

| | | | |
|---|---|---|---|
| 4,514,529 | 4/1985 | Beers et al. | 523/200 |
| 4,649,005 | 3/1987 | Kobayashi et al. | 264/101 |
| 5,013,781 | 5/1991 | Koshii et al. | 524/864 |
| 5,266,631 | 11/1993 | Arai et al. | 524/847 |
| 5,616,647 | 4/1997 | Dziark et al. | 524/788 |
| 5,633,302 | 5/1997 | Adachi et al. | 524/262 |
| 5,639,823 | 6/1997 | Adachi et al. | 524/864 |

FOREIGN PATENT DOCUMENTS

| | | |
|---|---|---|
| 599616 | 6/1994 | European Pat. Off. |
| 41361 | 2/1990 | Japan |
| 53902 | 2/1992 | Japan |

OTHER PUBLICATIONS

U.S. application Ser. No. 08/534,964, filed 28 Sep. 95, Titles "One–Package, Room–Temperature–Vulcanizable Silicone Elastomer Composition".

U.S. application Ser. No. 08/590,265, filed 21 Nov. 95, Title: "Method for the Preparation of One–Package, Room–Temperature–Vulcanizable Silicone Elastomer Composition".

*Primary Examiner*—Margaret W. Glass
*Attorney, Agent, or Firm*—Roger H. Borrousch; William F. Boley

[57] ABSTRACT

A method for the preparation of one-package room-temperature-curable silicone compositions that do not slump prior to their cure, do not crack or fissure during their cure even when deformed by an external force, and do not yellow where an example of the room-temperature-curable silicone compositions is (a) hydroxyl-terminated diorganopolysiloxane,
(b) oxime-functional organosilicon compound, and
(c) inorganic filler according to the following four steps:

step (1) in which 20 to 70 weight % of the total amount of component (a) is mixed with methyltris(methyl ethyl ketoximo)silane, step (2) in which component (c) is added and mixed into the mixture prepared in step (1).

step (3) in which 30 to 80 weight % of the total amount of component (a) is mixed with vinyltris(methyl ethyl ketoximo)-silane.

step (4) in which the mixture prepared in step (3) is mixed with the mixture prepared in step (2).

8 Claims, 1 Drawing Sheet

METHOD FOR THE PREPARATION OF ONE-PACKAGE ROOM-TEMPERATURE-CURABLE SILICONE COMPOSITIONS

BACKGROUND OF THE INVENTION

1. Field of the Invention

This invention relates to a method for preparing one-package room-temperature-curable silicone compositions (hereinafter abbreviated as OP/RTC silicone compositions) which can be stored in paste form for long periods of time in a sealed container and which are rapidly cured by moisture when extruded into the atmosphere.

More specifically, this invention relates to a method for preparing OP/RTC silicone compositions (i) wherein the paste-form composition does not slump prior to its cure and can be extruded from its storage container, such as a tube or cartridge, using little force, (ii) that have an excellent processability in that their skinning time after extrusion into the atmosphere is long enough to secure a suitable processing or working time, (iii) that do not crack or fissure during their cure even when deformed by an external force, and (iv) that do not yellow during storage or after curing even when subjected to thermal episodes. In addition, the present invention relates to a method for preparing one-package room-temperature-curable silicone compositions that is suitable for the preparation of same using a continuous mixing process.

2. Background Information

Description of the Prior Art and Problems Therein

OP/RTC can be cured into rubbery elastic silicone elastomers and are widely used as sealants, coatings, and adhesives in various sectors, such as the construction and civil engineering sectors, general manufacturing, and electronic and electrical sectors. In particular, the so-called oxime-type room-temperature-curable silicone compositions, which produce a ketoxime by-product at the time of curing, have entered into broad use by virtue of their low corrosion of the various contacted substrates and their high storage stability.

The use of these OP/RTC silicone compositions involves their storage in a sealed container, such as a tube or cartridge; then, at the actual point of application, extrusion of the silicone composition as a paste; and thereafter finishing the surface to smoothness using, for example, a spatula. Thus, the surface of the composition must not cure for the particular period of time elapsing from extrusion into the atmosphere until finishing. Nor must the composition flow downward when filled into a vertical or downward-slanting position, i.e., it must be slump-free. Moreover, little force must be required to extrude the composition from the sealed container, such as a tube or cartridge.

Even when the surface has begun to cure, additional time is required for the curing region to develop adequate mechanical strength, and deformation of the composition by outside forces is problematic during the time interval extending from cure initiation at the surface until the development of mechanical strength. In specific terms, when subjected to a stretching or elongational deformation, the curing region will rupture due to its inadequate mechanical strength. This occurrence of rupture in one location can lead to fracture of the entire body after its cure due to stress concentration at the said rupture site. The occurrence of rupture during the course of curing can be prevented by increasing the cure rate of subject silicone compositions, however simply increasing the cure rate functions to shorten the working time available for spatula finishing. The use of this approach is also associated with a ready tendency for the silicone composition to yellow during storage. The development is therefore desired of an OP/RTC that will exhibit an acceptable working time but which will rapidly develop mechanical strength once curing has started.

OP/RTC silicone compositions have heretofore typically been prepared using batch mixers. However, given the recent sharp increase in demand for OP/RTC silicone compositions, the development of a rapid and continuous production technology is desired. As a result, the use of a twin-screw extruder mixer has been attempted, as disclosed by Kobayashi et al in U.S. Pat. No. 4,649,005, issued Mar. 10, 1987, equivalent to Japanese Patent Publication Number Hei 4-28008 (1992), and a static mixer, as disclosed by Dziark et al in European Patent Publication of Application No. 0599616, published Jun. 1, 1994, and equivalent to Japanese Patent Application Laid Open (Kokai or Unexamined) Number Hei 6-234148 (1994). However, just the simple application of continuous mixing technology to OP/RTC silicone compositions that have heretofore been prepared in batch mixers has hardly served to satisfy all of the requirements regarded as necessary in connection with the above-described OP/RTC silicone compositions. Accordingly, the development has been desired of a formulation for the rapid production using continuous mixing devices of one-package room-temperature-curable silicone compositions that will satisfy all requirements.

Japanese Patent Application Laid Open (Kokai or Unexamined) Number Hei 4-53902 (1992) proposes a composition in which the crosslinker consists in part of a silane compound having four oxime groups bonded to one silicon. This composition exhibits appropriate rates of surface cure and mechanical strength development. However, the tetraoximosilanes present an explosion risk, etc., when the organic solvent used in their synthesis is removed, but avoiding this forces the production of a composition that contains organic solvent. Therefore, the use of trioximosilanes and the omission of tetraoximosilanes, as in the examples of the prior art provided below, is preferred for economic and safety reasons.

Japanese Patent Application Laid Open (Kokai or Unexamined) Number Hei 2-41361 (1990) proposes the preparation of OP/RTC silicone compositions by first mixing the crosslinker and hydroxyl-terminated diorganopolysiloxane and then admixing the filler. This preparative method does yield a slumping-inhibited composition, which, however, suffers from a number of other problems. Thus, it is prone to exhibit an extremely rapid surface cure rate and requires a long period of time for the skinned film to develop mechanical strength. Moreover, this composition is also hard to extrude.

Improvements to Japanese Patent Application Laid Open (Kokai or Unexamined) Number Hei 2-41361 are proposed by Arai et al in U.S. Pat. No. 5,266,631, issued Nov. 30, 1993, which claims priority to both Japanese Patent Application Laid Open (Kokai or Unexamined) Numbers Hei 4-366171 (1992) and Hei 5-105813 (1993). Methods are proposed therein that provide slump inhibition, a suitably controlled surface cure rate, and a suitably adjusted time to mechanical strength development by the skinned film. This is achieved by using a moisture-depleted filler or by bringing the quantity of crosslinker added prior to filler addition into an appropriate range. However, these methods still do not yield an acceptable problem resolution. Thus, when the yellowing-resistant and economically advantageous methyltrioximosilanes are used as crosslinkers, the time to mechanical strength development by the skinned film becomes too long and surface cracking occurs under difficult curing conditions. As described in the working examples of these proposals, these drawbacks can be solved by changing the crosslinker over to the highly active vinyltrioximosilanes or by their combined use with the methyltrioximosilanes. However, large amounts of vinyltrioximosilane must be used in order to prevent surface cracking, which in turn causes new problems, for example, the composition now has a pronounced tendency to yellow during storage and is uneconomical. Moreover, no improvement was provided with regard to the difficult extrusion.

Japanese Patent Application Laid Open (Kokai or Unexamined) Number Hei 2-41361 and European No. 0599616 propose methods in which the filler is admixed after the crosslinker has been mixed with hydroxyl-terminated diorganopolysiloxane, but the latter method then continues with the addition of a nonreactive diorganopolysiloxane. This method solves two problems in that it inhibits slump and improves the extrudability. However, it cannot solve the problem of inhibiting surface cracking while maintaining a suitable working time. Moreover, in order to avoid post-cure bleed and a reduction in adherence, the amount of nonreactive diorganopolysiloxane added after the filler cannot be too large, but this restriction prevents the improvement in extrudability from reaching an entirely satisfactory level.

SUMMARY OF THE INVENTION

Problems to Be Solved by the Invention

The inventors achieved the present invention as the result of extensive investigations directed to solving the problems described above.

In specific terms, then, the object of the present invention is to provide a method for the preparation of one- package room-temperature-curable silicone compositions (i) that do not slump prior to their cure and can be extruded from their storage container, such as a tube or cartridge, using little force, (ii) that have an excellent processability in that their skinning time after extrusion into the atmosphere is long enough to secure a suitable processing or working time, (iii) that do not crack or fissure during their cure even when deformed by an external force, and (iv) that do not yellow during storage or after curing even when subjected to thermal episodes. Another object of the present invention is to provide a method for preparing one-package room-temperature-curable silicone compositions that is suitable for the preparation of same using a continuous mixing process.

Means Solving the Problems and Function Thereof

The present invention relates to a method for the preparation of a one-package room-temperature-curable silicone composition, said method comprising the preparation of a room-temperature-curable silicone composition comprising (a) 100 parts by weight of hydroxyl-terminated diorganopolysiloxane with a viscosity at 25° C. of 0.5 to 300 Pa.s, (b) 0.5 to 20 parts by weight of a mixture of organosilanes with the formula $R^1Si(OX)_3$ in which $R^1$ represents a monovalent hydrocarbon group having no more than four carbon atoms and X is an organic group of the formula $-N=CR^2R^3$ in which each $R^2$ and $R^3$ represents monovalent hydrocarbon groups having no more than six carbon atoms; an organic group of the formula

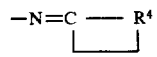

in which $R^4$ represents a divalent hydrocarbon group having no more than 10 carbon atoms; or a $C_1$ to $C_4$ monovalent hydrocarbon group wherein the $C_1$ to $C_4$ monovalent hydrocarbon groups make up no more than 30 mole % of X, and (c) 5 to 200 parts by weight inorganic filler according to the following four steps:

step (1) in which 20 to 70 weight % of the total amount of component (a) is mixed with component (b) in which $R^1$ is a saturated monovalent hydrocarbon group, step (2) in which component (c) is added and mixed into the mixture prepared step (1), step (3) in which 30 to 80 weight % of the total amount of component (a) is mixed with component (b) in which $R^1$ is vinyl, and step (4) in which the mixture prepared in step (3) is mixed into the mixture prepared in step (2).

BRIEF DESCRIPTION OF THE DRAWING

Description of the Figure

Figure 1:
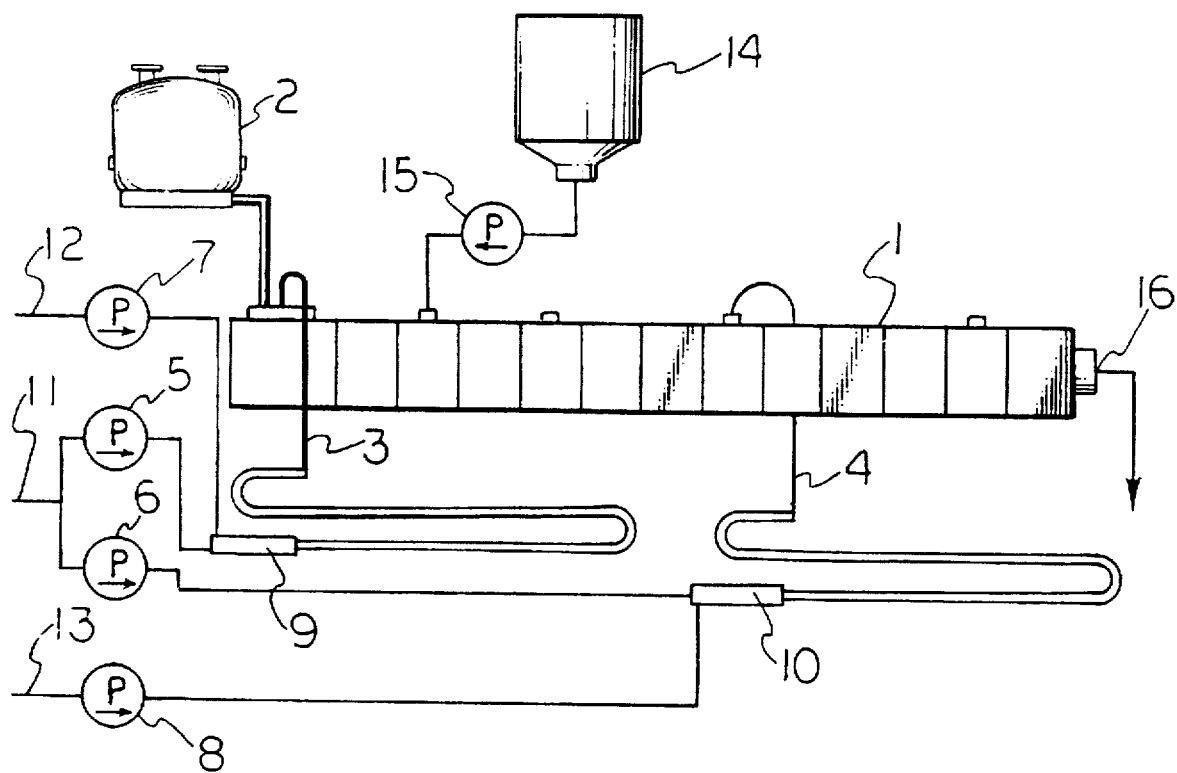

The FIG. 1 is a schematic drawing of a twin-screw mixer/extruder.

Explanation of the Reference Numbers 1 twin-screw mixer/extruder
2 feeder for fumed silica filler
3 pipe for liquid polymer
4 pipe for liquid polymer
5 metering pump for liquid polymer
6 metering pump for liquid polymer
7 metering pump for Crosslinker M
8 metering pump for Crosslinker V
9 small dynamic mixer
10 small dynamic mixer
11 liquid polymer feed
12 Crosslinker M feed
13 Crosslinker V feed
14 catalyst storage container
15 metering pump for catalyst
16 outlet for OP/RTC

DETAILED DESCRIPTION OF THE PREFERRED EMBODIMENTS

The diorganopolysiloxane (a) used by the present invention is hydroxyl-terminated diorganopolysiloxane. Its pendant organic groups consist of substituted and unsubstituted monovalent hydrocarbon groups, which are specifically exemplified by alkyl groups such as methyl, ethyl, and so forth; aryl groups such as phenyl and so forth; haloalkyl groups such as trifluoropropyl and so forth; and alkenyl groups such as vinyl, allyl, and so forth. The viscosity of this diorganopolysiloxane must be in the range of 0.5 to 300 Pa.s at 25° C. Viscosities below 0.5 Pa.s cause a reduced post-cure mechanical strength, while viscosities in excess of 300 Pa.s cause the silicone composition to exhibit an extremely reduced pre-cure workability. The subject diorganopolysiloxane may contain some small amount of branching. As long as, at least 50 mole % of the terminals of the diorganopolysiloxane (a) carry the hydroxyl group, the remainder may be endblocked with inert groups such as trimethylsiloxy and the like. The invention can use two or more diorganopolysiloxanes differing in their viscosity and/or proportion of endblocking by inert groups. Moreover, these two or more species of diorganopolysiloxanes can be used in different steps of the preparative method described below.

The organosilanes of (b) are used by the present invention as crosslinkers for component (a). Component (b) is an organosilane mixture as described above. Typical examples of the organosilanes of the mixture are methyltri(methyl ethyl ketoximo)silane and vinyltri(methyl ethyl ketoximo) silane. While $C_1$ to $C_4$ monovalent hydrocarbon groups may account for a portion of X, this amount must not exceed 30 mol % in the organosilane mixture (b). The OP/RTC silicone composition will not exhibit an acceptable storage stability when this fraction exceeds 30 mole %. The component in which $R^1$=vinyl, such as vinyltri(methyl ethyl ketoximo) silane, desirably does not exceed 50 weight % of component (b). Not only can a significant improvement in properties not be expected at proportions in excess of 50 weight %, but such proportions readily produce such problems as a tendency to yellow and are also economically undesirable. The quantity of addition of component (b) is determined based on such factors as the balance with component (a) as a parameter involved with the mechanical strength required of the cured silicone elastomer, component (c), and the impurities, such as water and so forth, present in component (c). Component (b) must be added at 0.5 to 20 parts by weight per 100 parts by weight component (a). Curing will be inadequate at below 0.5 part by weight, while a complete cure cannot be obtained at above 20 parts by weight.

The inorganic filler (c) used in the present invention can be a reinforcing agent, and its function is to improve the mechanical properties of the cured silicone elastomer. While component (c) will ordinarily take the form of a reinforcing silica micropowder, for example, a dry-process silica or wet-process silica, other inorganic fillers can be used here, for example extending fillers such as, calcium carbonate, and metal oxides such as titanium oxide and aluminum oxide. When reinforcing silica micropowder is used, the silica is present in an amount of from 5 to 50 parts by weight per 100 parts by weight of (a), preferably from 5 to 25 parts by weight per 100 parts by weight of (a). Amounts of reinforcing silica filler of 5 to 25 parts by weight per 100 parts by weight of (a) provide OP/RTC silicone compositions which are more easily extrudable. These reinforcing silica fillers have a specific surface of 50 to 400 m²/g by the BET method. Moisture adsorbs quite readily to the surface of such silica micropowder, and when mixed into the composition this moisture can cause a loss of performance by the invention composition by reacting with component (b). The adsorbed moisture is therefore desirably minimized as much as possible prior to admixture. The silica micropowder may be directly used without additional processing, but may also be used after its surface has been subjected to a hydrophobicizing treatment. Hydrophobicized silica is exemplified by hexamethyidisilazane-treated silica, dimethyidichlorosilane-treated silica, dimethyldimethoxysilane-treated silica, methyltrimethoxysilane-treated silica, and so forth. This component must be added at 5 to 200 parts by weight per 100 parts by weight component (a). Adequate reinforcement is not obtained in the cured silicone elastomer at an addition below 5 parts by weight, while additions in excess of 200 parts by weight cause a loss of elasticity in the cured product and make it difficult to extrude the composition from its container.

The addition of a curing catalyst, a component (d) is recommended in the present invention for the purpose of accelerating the cure between components (a) and (b). Any catalytic compound heretofore known in the art may be used as component (d) insofar as the functions of the invention composition are not impaired. Component (d) is exemplified by tin catalysts such as the dialkyltin dicarboxylates, titanate esters such as tetrabutyl titanate, and amine catalysts such as tetramethylguanidine. While component (d) will ordinarily take the form of a single selection, combinations of two or more selections may also be used. This component, when added, must be added at the rate of 0.005 to 2 parts by weight per 100 parts by weight component (a). Additions in excess of 2 parts by weight frequently bring out negative effects such as yellowing and a loss of water resistance and heat resistance. No effect is obtained for the addition of less than 0.005 part by weight.

Component (e) consists of an aminosilane containing 2 to 3 hydrolyzable groups and an amino group bonded to silicon across a $C_1$ to $C_6$ divalent hydrocarbon group or the siloxane derivative of such a silane, and the addition of component (e) in the present invention is recommended. This aminosilane is exemplified by 3-aminopropyltrimethoxysilane, 3-aminopropyltriethoxysilane, 3-aminopropylmethyldimethoxysilane, 2-aminoethyl-3-aminopropyltrimethoxysilane, and the like. The aminosilanes can be used as such, or they can be added after conversion into derivatives such as their partial hydrolyzates and reaction products with other siloxanes. This component, when added, must be added at 0.1 to 10 parts by weight per 100 parts by weight component (a). Additions in excess of 10 parts by weight frequently bring out negative effects such as yellowing and a loss of water resistance and heat resistance. No effect is obtained for the addition of less than 0.1 part by weight.

The characteristic features of the present invention reside in the procedure and proportions for intermixing the above-described components (a) through (c). 20 to 70 weight % of the total amount of component (a) is mixed in step (1) with component (b) in which $R^1$ is a saturated monovalent hydrocarbon group. When less than 20 weight % of the total amount of component (a) is admixed in this step, it becomes impossible to achieve a thorough mixing with component (c) in step (2). When more than 70 weight % of the total amount of component (a) is admixed, the composition afforded by the invention method suffers from a reduced extrudability, and, in addition, a poor dispersion is obtained for component (c) when the composition is rapidly manufactured in a continuous mixer. It is essential that $R^1$ in the component (b) used in step (1) be a saturated monovalent hydrocarbon group. The use of an unsaturated monovalent hydrocarbon group for $R^1$ is not only uneconomical, but also readily causes such problems as gel production during manufacture and a strong tendency for the fabricated composition to yellow. The maximum amount of component (b) used in step (1) is the amount obtained by subtracting the portion used in step (3) from the amount of component (b) in the overall OP/RTC silicone composition afforded by the preparative method according to the present invention. The minimum amount of component (b) used in step (1) is the amount at which gelation does not occur when component (c) is admixed under moisture- excluding conditions in step (2). This minimum amount will vary widely as a function of the type, quantity of addition, history, impurity content, mixing conditions, etc., of/for the various components used. However, the criterion for the minimum amount can be specified as an amount at which just some small amount of component (b) remains present after reaction with the hydroxyl groups and adsorbed moisture present in the component (a) used in step (1) and the component (c) used in step (2). The preferred quantity of component (b) used in step (1) is the amount obtained by subtracting the required minimum amount of component (b) used in step (3) from the optimal total amount of component (b) in the composition prepared by the method according to the present invention. In the preferred case of the addition of components (d) and (e) diluted with a small amount of component (b), this amount is also subtracted. The preferred quantity of use of component (b) in step (1) will generally be at least 50 weight % of the total amount of component (b).

Mixing in step (1) is preferably carried out while excluding moisture. The failure to do so is not only uneconomical due to the resulting increase in the component (b) requirement, but also has a pronounced tendency to generate performance problems such as, for example, variations in composition properties as a function of environmental conditions. Mixing of this nature may be carried out in an open mixer under an atmosphere of an inert gas like nitrogen, but the use of a sealed mixer that does not draw in gas is recommended in order to prevent the hydrolysis of component (b). When component (a) is mixed with component (b) in which $R^1$=vinyl, the silanol groups at the ends of the polymer in component (a) react rapidly with component (b) at room temperature to yield a reaction mixture. In the case of a very slow mixing rate, the component (b) concentration will be nonuniform and a partial gelation will occur. This makes it desirable to carry out mixing at a rate sufficient to yield an almost homogeneous mixture within several minutes.

When component (a) is mixed with component (b) by the procedure described above, the reaction is almost complete within several minutes. Component (c) is preferably added in ensuing step (2) after completion of the reaction between components (a) and (b). Failure to do this causes such problems as a large slump in the resulting composition, a reduced curability, and diminished post-cure mechanical properties. A time period of at least 1 minute is preferably inserted between the combination of components (a) and (b) in step (1) and the addition of component (c) in step (2), while an interval of 3 to 5 minutes is even more desirable.

The reaction mixture prepared in step (1) as described above is then combined and mixed with component (c) in step (2). While the mixing technique is not critical in this case, mixing is preferably carried out under an atmosphere that excludes atmospheric moisture. Heating is not required; rather, it is recommended that means be implemented to prevent the increase in temperature during mixing caused by the generation of heat due to shear. The air entrained with the inorganic filler is removed during or after mixing in step (2) or at a subsequent stage of production. The timing of entrained air removal is not a critical issue and can be selected according to the methodology used to carry out the present invention. For example, in the case of a batch mixer such as a planetary mixer, the entrained air is preferably removed in a final stage after the thorough mixture of all components in step (4). In the case of a continuous production device such as a twin-screw continuous mixer extruder, the entrained air is preferably removed as early as during mixing in step (2) and in a final stage.

After component (c) has been added in step (2), it is not essential that the dispersion of component (c) be completed prior to proceeding into step (4). The time interval from after the addition of component (c) until entering into step (4) will vary substantially as a function of the mixer and conditions therein and therefore cannot be rigorously specified. However, an interval from about several seconds to about 10 minutes is preferably set up. An inadequate time interval here cause such problems as a poor composition extrudability and the production of fine gel.

Mixing in step (3) is carried out separately from the above-described steps (1) and (2). In step (3), the component (a) remaining after step (1) is mixed with component (b) in which $R^1$=vinyl. When an organosilane in which $R^1$ is not vinyl is used for component (b), the characteristic features of a composition prepared according to the present invention will not be obtained, that is, the absence of surface cracking coupled with maintenance of a suitable working time. As little component (b) as possible should be used in step (3) with the provisos that the reaction mixture prepared in step (3) should not suffer from a substantially increased viscosity or gel production. As a result, the rule for the lower limit is that quantity of addition at which some small quantity of the added component (b) remains unreacted after the reaction between component (b) and the moisture fraction and hydroxyl end groups in the component (a) used in step (3). This reaction can be followed by $^{29}$Si-NMR and other techniques. Preparation by the method according to the present invention can be accomplished even when component (b) with $R^1$=vinyl is added in a quantity exceeding the aforesaid lower limit. However, this yields almost no improvement in the properties of the composition, but on the contrary tends to promote such problems as yellowing in response to thermal episodes during storage and post-cure and is also uneconomical. Thus, additions in excess of the required quantity are undesirable. For this reason component (b) is most preferably added in step (3) at 1.5 to 5 times __ expressed on an equivalents basis __ that of the hydroxyl group present in the component (a) used in step (3).

Mixing in step (3) is preferably carried out while excluding moisture. The failure to do so is not only uneconomical due to the resulting increase in the component (b) requirement, but also has a pronounced tendency to generate performance problems such as, for example, variations in composition properties as a function of environmental conditions. Mixing of this nature may be carried out in an open mixer under an atmosphere of an inert gas like nitrogen, but the use of a sealed mixer that does not draw in gas is recommended in order to prevent the hydrolysis of component (b). When component (a) is mixed with component (b), the silanol groups at the ends of the polymer in component (a) react rapidly with component (b) at room temperature to yield a reaction mixture. In the case of a very slow mixing rate, the component (b) concentration will be nonuniform and a partial gelation will occur. This makes it desirable to carry out mixing at a rate sufficient to yield an almost homogeneous mixture within several minutes.

When components (a) and (b) are mixed in step (3) as described above, the reaction is almost complete within several minutes. Addition to the reaction mixture prepared by steps (1) and (2) is desirably done after the completion of the reaction between components (a) and (b) in step (3). Failure to do this causes such problems as a large slump in the resulting composition, a reduced curability, and diminished post-cure mechanical properties. A time period of at least 1 minute is preferably provided after the combination of components (a) and (b) in step (3), while an interval of 3 to 5 minutes is even more desirable.

In step (4), the reaction mixture prepared in step (3) from component (a) and component (b) with $R^1$ being vinyl is added to the reaction mixture prepared from components (a) to (c) in steps (1) and (2). While the mixing technique is not critical in this case, mixing is preferably carried out under an atmosphere that excludes atmospheric moisture. Heating is not required; rather, it is recommended that means be implemented to prevent the increase in temperature during mixing caused by the generation of heat due to shear. In the absence of a supplemental mixing step after the completion of step (4), mixing must be run in step (4) until component (c) has been thoroughly dispersed. Unless the air entrained with component (c) has been thoroughly removed in step (2) and mixing in step (4) is run without drawing in gas, the air entrained with component (c) must be thoroughly eliminated during the course of step (4) or in its final stage through a means such as, for example, pressure reduction. Step (4) can be run in a batch mixer such as a planetary mixer, but this process is more suitably run in a device, such as a twin-screw extruder, that is capable of a rapid and continuous mixing without taking in gas during mixing.

The preparative method according to the present invention as described above yields a OP/RTC silicone composition that displays an excellent property balance. But in addition to components (a) to (c), said composition can contain as optional components a curing catalyst, component (d), and/or an aminosilane or derivative thereof, component (e). While the direct addition of these components to component (a) is preferably avoided, the timing of addition is not otherwise critical. However, their addition is preferably carried out after the addition of component (c) in step (2). Otherwise there is a pronounced tendency for such problems to occur as yellowing and the production of fine gel in the resulting composition, and, in the case of continuous production devices, there is a pronounced tendency for large lumps to accumulate in the vicinity of the component (c) feed inlet.

Component (d) and/or component (e) may be added separately or after having been preliminarily mixed with each other. It is also possible to preliminarily mix 3 components, i.e., component (d) and component (e) and a part of component (b), and add this mixture. Component (d) and/or component (e) can also be added after preliminarily mixing with the reaction mixture from components (a) and (b) prepared in step (1) or step (3). Component (d) and/or component (e) can be diluted with silanol-free diorganopolysiloxane prior to their addition.

The method according to the present invention as described above yields an OP/RTC silicone composition that displays an excellent property balance. But in addition, the preparative method according to the present invention is specifically adapted to composition preparation by the continuous supply of the starting materials and their continuous and rapid mixing. In consequence thereof, a particularly preferred method comprises a continuous mixing process built up from three mixing devices, that is, a sealed continuous mixer that executes step (1), a sealed continuous mixer that executes step (3), and a continuous mixing production device that implements steps (2) and (4). A degassing function may be placed in the middle or final stage of the continuous mixing production device that implements steps (2) and (4), or degassing and a final mixing can be run after step (4) in another degassing-capable mixer.

The following ingredients can be added in the preparative method according to the present invention insofar as the object of the invention is not impaired: silanol-free diorganopolysiloxanes, silicone resins, fluidity adjusters, adhesion promoters, pigments, heat stabilizers, flame retardants, antimolds, organic solvents, and the like.

An OP/RTC silicone composition prepared by the preparative method according to the present invention as described above can be stored as a paste in a sealed container for long periods of time. Moreover, the uncured paste will not exhibit slump and can be extruded from its storage container, e.g., a tube or cartridge, by a small force. In addition, because the composition provides a suitably long period of time from extrusion into the atmosphere to the formation of a surface film, it secures an appropriate working time and thus is highly workable. The subject method yields an OP/RTC silicone composition that displays an excellent property balance in that the composition will not crack even when deformed by external forces during the course of curing and will not yellow when challenged by thermal episodes during storage or after curing. The subject method is also adapted to continuous production. In sum, then, this method is particularly useful as a method for preparing adhesives, coatings, sealants, and the like.

The present invention will be explained in greater detail in the following through working and comparative examples, in which "parts" denotes "parts by weight", the reported viscosity values were measured at 25° C., and Pa.s is an abbreviation for pascal-seconds. The Polymer A referenced below consisted of a mixture of 70 weight % dimethylpolysiloxane (viscosity=17 Pa.s) endblocked at both terminals by hydroxyl and the other terminal with trimethylsiloxy and 30 weight % dimethylpolysiloxane (viscosity=17 Pa.s) endblocked at one terminal by hydroxyl. The Polymer B referenced below consisted of a mixture of 85 parts dimethylpolysiloxane (viscosity=12 Pa.s) endblocked at both terminals by hydroxyl and 15 parts dimethylpolysiloxane (viscosity=0.1 Pa.s) endblocked by trimethylsiloxy at both terminals. Below, Crosslinker M refers to methyltri(methyl ethyl ketoximo)silane and Crosslinker V refers to vinyltri(methyl ethyl ketoximo)silane. All processes in the examples were run taking every precaution to avoid contact between atmospheric moisture and the starting materials, the in-process materials, and the produced composition.

The properties of the compositions prepared in the examples and comparative examples were evaluated using the following methods.

Slump

This was measured in accordance with ASTM D2202-73. A slump of 1 mm or less is unproblematic in practice, while a slump of 0 mm is even more desirable.

Tack-free-time

The tack-free-time was measured as an index of the working time. The evaluation was carried out according to JIS A 5758. In practical terms a tack-free-time of 5 minutes or more represents a satisfactory working time, while a tack-free-time of 10 minutes or more is even more desirable.

Extrudability

The amount extruded was measured when the composition was discharged through a ⅛-inch nozzle at a pressure of 618.8 Pa. From a practical standpoint an extrusion of at least 400 g/minute is indicative of a satisfactory workability, while values of 450 g/minute or more are even more desirable.

Surface cracking time

Surface cracking time was evaluated as an index of the tendency for the composition to crack during the course of its cure. The test method consisted of first applying the composition on an aluminum panel, curing for a prescribed period of time at 25° C., and then executing a 180° fold in the aluminum panel. The value measured was the time until there was no occurrence of cracking in the surface of the composition at this point while keeping the specimen folded. Surface cracking times of 120 minutes or less may be taken as indicative from a practical standpoint of a low probability of cracking, while times of 60 minutes or less are even more desirable.

Durometer

The composition was molded into a 2 mm-thick sheet and cured at 25° C./50% humidity for 5 days and the durometer of this sheet was measured in accordance with JIS K 6301.

Yellowing

After its preparation, the composition was filled into a ½-L plastic cartridge and held for 8 weeks in a 95% humidity/40° C. atmosphere. The cartridge was then cut open, and the color change in the composition was inspected.

EXAMPLE 1

23.3 g crosslinker V was added under a nitrogen blanket to 900 g Polymer A followed by mixing at room temperature for 30 minutes to yield a Polymer A/Crosslinker V mixture. This mixture was transferred into a sealed container while exercising care to avoid contact with moisture. Separately, 66.5 g Crosslinker M was added under a nitrogen blanket to 400 g polymer A with mixing at room temperature for 30 minutes. 115 g dry-process silica (BET specific surface=200 $m^2/g$) was then added immediately after the silica had been dried at 120° C. for 3 hours, and this addition to the Polymer A/Crosslinker M mixture was followed by thorough mixing under a nitrogen atmosphere. Thereafter, 615.5 g of the polymer A/crosslinker V mixture was added with thorough mixing, and 8.6 g gamma-(2-aminoethyl) aminopropyltrimethoxysilane as adhesion promoter and 2.5 g dibutyltin dilaurate as curing catalyst were then added with thorough mixing under nitrogen. This was followed by degassing in a vacuum while mixing to yield an OP/RTC silicone composition. This composition was filled into a 330 mL-cartridge. The results from the evaluation of this composition were as reported in Table 1.

COMPARATIVE EXAMPLE 1

A Polymer A/Crosslinker V mixture was prepared as in Example 1 and transferred to a sealed container. Separately, 66.5 g Crosslinker M was added under a nitrogen blanket to 400 g Polymer A with mixing at room temperature for 30 minutes. This was followed by the addition of 615.5 g of the Polymer A/Crosslinker V mixture, mixing at room temperature for 10 minutes, addition of 115 g dry-process silica (BET specific surface=200 $m^2/g$) immediately after the silica had been dried at 120° C. for 3 hours, and thorough mixing under a nitrogen atmosphere. Finally, 8.6 g gamma-(2-aminoethyl)aminopropyltri-methoxysilane as adhesion promoter and 2.5 g dibutyltin dilaurate as curing catalyst were added with thorough mixing under nitrogen. This was followed by degassing in a vacuum while mixing to yield an OP/RTC silicone composition. This composition was filled into a 330 mL-cartridge. The results from the evaluation of this composition were as reported in Table 1.

COMPARATIVE EXAMPLE 2

An OP/RTC silicone composition was prepared as in Example 1 with the exception that Crosslinker M was replaced by the same amount of Crosslinker V. This composition was also filled into a cartridge. The results from the evaluation of this composition were as reported in Table 1.

COMPARATIVE EXAMPLE 3

An OP/RTC silicone composition was prepared as in Example 1 with the exception that Crosslinker V was replaced by the same amount of Crosslinker M. This composition was also filled into a cartridge. The results from the evaluation of this composition were as reported in Table 1.

TABLE 1

|  | Example | Comparative Examples | | |
| --- | --- | --- | --- | --- |
|  | 1 | 1 | 2 | 3 |
| Slump, mm | 0 | 0 | 0 | 0 |
| Extruded amount, g/min. | 440 | 250 | 420 | 460 |
| Tack-free-time, min. | 5 | 6 | 4 | 8 |
| Surface cracking time, min | 50 | 60 | 40 | 350 |
| Durometer | 24 | 24 | 25 | 23 |
| Yellowing | no | no | yes | no |

EXAMPLE 2

23.3 g Crosslinker V was added under a nitrogen blanket to 1050 g Polymer A followed by mixing at room temperature for 30 minutes to yield a Polymer A/Crosslinker V mixture. This mixture was transferred into a sealed container while exercising care to avoid contact with moisture. Separately, 50.2 g Crosslinker M was added under a nitrogen blanket to 300 g Polymer A with mixing at room temperature for 30 minutes. 115 g dry-process silica (BET specific surface of the original silica=130 $m^2/g$) whose surface had been treated with dimethyldichlorosilane was then added with thorough mixing under a nitrogen atmosphere. Thereafter, 715.5 g of the Polymer A/Crosslinker V mixture was added with thorough mixing, and 8.6 g gamma-(2-aminoethyl)aminopropyltrimethoxysilane as adhesion promoter and 0.3 g dibutyltin dilaurate as curing catalyst were then added with thorough mixing under nitrogen. This was followed by degassing in a vacuum while mixing to yield an OP/RTC silicone composition. This composition was filled into a 330 mL-cartridge. The results from the evaluation of this composition were as reported in Table 2.

EXAMPLE 3

23.3 g Crosslinker V was added under a nitrogen blanket to 900 g Polymer A followed by mixing at room temperature for 30 minutes to yield a Polymer A/Crosslinker V mixture. This mixture was transferred into a sealed container while exercising care to avoid contact with moisture. Separately, 50.2 g Crosslinker M was added under a nitrogen blanket to 400 g Polymer A with mixing at room temperature for 30 minutes. 115 g dry-process silica (BET specific surface of the original silica=130 $m^2/g$) whose surface had been treated with dimethyldichlorosilane was then added with thorough mixing under a nitrogen atmosphere. Thereafter, 615.5 g of the Polymer A/Crosslinker V mixture was added with thorough mixing, and 8.6 g gamma-(2-aminoethyl) aminopropyltrimethoxysilane as adhesion promoter and 0.3 g dibutyltin dilaurate as curing catalyst were then added with thorough mixing under nitrogen. This was followed by degassing in a vacuum while mixing to yield a OP/RTC silicone composition. This composition was filled into a 330 mL-cartridge. The results from the evaluation of this composition were as reported in Table 2.

EXAMPLE 4

23.3 g Crosslinker V was added under a nitrogen blanket to 600 g Polymer A followed by mixing at room temperature for 30 minutes to yield a Polymer A/Crosslinker V mixture. This mixture was transferred into a sealed container while exercising care to avoid contact with moisture. Separately, 50.2 g Crosslinker M was added under a nitrogen blanket to 600 g Polymer A with mixing at room temperature for 30 minutes. 115 g dry-process silica (BET specific surface of the original silica=130 m$^2$/g) whose surface had been treated with dimethyldichlorosilane was then added with thorough mixing under a nitrogen atmosphere. Thereafter, 415.5 g of the Polymer A/Crosslinker V mixture was added with thorough mixing, and 8.6 g gamma-(2-aminoethyl) aminopropyltrimethoxysilane as adhesion promoter and 0.3 g dibutyltin dilaurate as curing catalyst were then added with thorough mixing under nitrogen. This was followed by degassing in a vacuum while mixing to yield an OP/RTC silicone composition. This composition was filled into a 330 mL-cartridge. The results from the evaluation of this composition were as reported in Table 2.

COMPARATIVE EXAMPLE 4

A Polymer A/Crosslinker V mixture was prepared as in Example 3 and transferred to a sealed container. Separately, 50.2 g Crosslinker M was added under a nitrogen blanket to 400 g Polymer A with mixing at room temperature for 30 minutes. This was followed by the addition of 615.5 g of the Polymer A/Crosslinker V mixture, mixing at room temperature for 10 minutes, the addition of 115 g dry-process silica (BET specific surface of the original silica=130 m$^2$/g) whose surface had been treated with dimethyldichlorosilane, and thorough mixing under a nitrogen atmosphere. Finally, 8.6 g gamma-(2-aminoethyl)aminopropyltrimethoxysilane as adhesion promoter and 0.3 g dibutyltin dilaurate as curing catalyst were added with thorough mixing under nitrogen. This was followed by degassing in a vacuum while mixing to yield an OP/RTC silicone composition. This composition was filled into a 330 mL-cartridge. The results from the evaluation of this composition were as reported in Table 2.

TABLE 2

|  | Examples | | | Comparative Example |
|---|---|---|---|---|
|  | 2 | 3 | 4 | 4 |
| Slump, mm | 0 | 0 | 0 | 0 |
| Extruded amount, g/min | 520 | 470 | 420 | 280 |
| Tack-free-time, min | 10 | 12 | 12 | 15 |
| Surface cracking time, min | 50 | 40 | 70 | 60 |
| Durometer | 23 | 23 | 24 | 24 |
| Yellowing | no | no | no | no |

EXAMPLE 5

The main element of the continuous mixer used in this example was a continuous twin-screw mixer/extruder 1 with an effective capacity of 0.2 L. Its two screws had diameters of 28 mm and lengths of 1,224 mm. Its raw material feed inlet communicated with a feeder 2 for the supply of silica micropowder and a pipe arrangement 3 for the supply of liquid polymer 11. This could be nitrogen blanketed so as to avoid contact with atmospheric moisture. A pipe arrangement 4 for the supply of liquid polymer 11 was connected at a position about two-fifths of the distance from the raw material feed inlet toward outlet 16, and this could also be nitrogen blanketed. An exhaust vent was installed at the rearmost part of the screws to permit maintenance of a vacuum through the action of a vacuum pump. Small dynamic mixers 9 and 10 were installed upstream in the liquid polymer supply pipe arrangements 3 and 4. These small dynamic mixers 9 and 10 were capable of mixing the high-viscosity component (a) with the low-viscosity component (b). These small dynamic mixers were connected with the continuous mixer by pipes of sufficiently large capacity that the mixture was actually fed into the continuous mixer after at least 2 minutes had elapsed. Metering pump 6 for Polymer A and metering pump 6 for Crosslinker M, for the continuous supply, respectively, of Polymer A and Crosslinker M were connected to the small dynamic mixer 9 that was connected to liquid polymer supply pipe arrangement 3. Metering pumps 6 for liquid Polymer A and metering pump 8 for Crosslinker V were similarly connected to the small dynamic mixer 10 that was connected to liquid polymer supply pipe arrangement 10. The curing catalyst and adhesion promoter were preliminarily mixed with a small quantity of crosslinker M to give a homogeneous catalyst component solution stored in catalyst storage container 14. This catalyst component solution was fed to the continuous mixer/extruder using a metering pump 15 for catalyst at a position about one-fifth of the distance from the raw material feed inlet to the outlet 16. The discharged composition was a OP/RTC which was directly filled in cartridges.

Dry-process silica (water content=0.3%, BET specific surface area=200 m$^2$/g) that had been stored under nitrogen was supplied from silica micropowder feeder 2 at a rate of 1.84 kg/hour. Polymer A was fed from metering pumps 5 and 6 at rates of 6.40 kg/hour and 9.60 kg/hour, respectively. Crosslinker M feed 12 was fed at a rate of 0.90 kg/hour from metering pump 7. Crosslinker V feed was fed at a rate of 0.25 kg/hour from metering pump 8. The catalyst component solution, which was a mixture of 1.0 part crosslinker M, 0.86 part gamma-(2-amino-ethyl)aminopropyltrimethoxysilane, and 0.25 part dibutyltin dilaurate, was fed from the catalyst storage container 14 using metering pump 15 at a rate of 0.34 kg/hour. The results from the evaluation of the resulting OP/RTC silicone composition were as reported in Table 3 below.

EXAMPLE 6

A OP/RTC silicone composition was prepared as in Example 5 with the following exceptions: the silica fed from silica micropowder feeder 2 was changed to a dry-process silica (BET specific surface area=130 m$^2$/g) whose surface had been treated with dimethyidichlorosilane, the quantity of Crosslinker M feed was fed from metering pump 7 was changed to 0.64 kg/hour, the catalyst component solution composition was changed to 1.0 part Crosslinker M, 0.86 part gamma-(2-aminoethyl)aminopropyltrimethoxysilane, and 0.03 part dibutyltin dilaurate, and its feed rate from metering pump 15 was changed to 0.30 kg/hour. The results from the evaluation of the resulting composition were as reported in Table 3 below.

EXAMPLE 7

A OP/RTC silicone composition was prepared as in Example 5 with the exception that the starting polymer fed from metering pumps 5 and 6 was changed to Polymer B. The results from the evaluation of the resulting composition were as reported in Table 3 below.

EXAMPLE 8

A OP/RTC silicone composition was prepared as in Example 6 with the exception that the starting polymer fed from metering pumps 5 and 6 was changed to Polymer B. The results from the evaluation of the resulting composition were as reported in Table 3 below.

EXAMPLE 9

A OP/RTC silicone composition was prepared as in Example 8 with the exception that the catalyst component solution was fed simultaneously with the liquid Polymer B through a connection to liquid polymer supply pipe arrangement 4 immediately in front of the feed to the continuous mixer/extruder. The results from the evaluation of the resulting composition were as reported in Table 3 below.

EXAMPLE 10

A mixture was prepared as in Example 8 with the exception that the catalyst component used in Example 8 was not added, and this mixture was received by a sealed batch mixing container while avoiding contact with moisture. 47 g of the catalyst component solution used in Example 8 was added to 2.92 kg of this mixture, and a OP/RTC silicone composition was prepared by thorough mixing under seal so as to avoid engulfing air bubbles. The resulting composition was filled into a 330-mL cartridge. The results from the evaluation of the resulting composition were as reported in Table 3 below.

TABLE 3

|  | Examples | | | | | |
| --- | --- | --- | --- | --- | --- | --- |
|  | 5 | 6 | 7 | 8 | 9 | 10 |
| Slump, mm | 0 | 0 | 0 | 0 | 0 | 0 |
| Extruded amount, g/min | 540 | 580 | 630 | 670 | 650 | 670 |
| Tack-free-time, min | 7 | 13 | 7 | 16 | 17 | 20 |
| Surface cracking time, min | 50 | 50 | 40 | 40 | 40 | 40 |
| Durometer | 24 | 23 | 27 | 28 | 28 | 28 |
| Yellowing | no | no | no | no | no | no |

Effects of the Invention

Because the method according to the present invention for the preparation of one-package room-temperature-curable silicone compositions comprises the above-described steps (1) to (4), said method is able to provide the following characteristic features: absence of precure slump, easy extrusion from the storage container, for example, a tube or cartridge, maintenance of an appropriate working time due to a suitably long interval between extrusion into the atmosphere and formation of a surface skin, absence of cracking during the course of curing even under deformation by external forces, and no yellowing even when challenged by thermal episodes during storage or after curing. Another characteristic feature of the subject method is that it is adapted to production through a continuous mixing process.

That which is claimed is:

1. A method for the preparation of a one-package room-temperature-curable silicone composition, said method comprising the preparation of the room-temperature-curable silicone composition comprising
   (a) 100 parts by weight of hydroxyl-terminated diorganopolysiloxane with a viscosity at 25° C. of 0.5 to 300 Pa.s,
   (b) 0.5 to 20 parts by weight of a mixture of organosilanes with the formula $R^1Si(OX)_3$ in which $R^1$ represents a monovalent hydrocarbon group having no more than four carbon atoms and is a mixture of vinyl and saturated monovalent hydrocarbon groups and X is an organic group of the formula $—N=CR^2R^3$ in which each $R^2$ and $R^3$ represents monovalent hydrocarbon groups having no more than six carbon atoms, an organic group of the formula

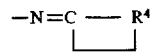

in which $R^4$ represents a divalent hydrocarbon group having no more than 10 carbon atoms, or a $C_1$ to $C_4$ monovalent hydrocarbon group wherein the $C_1$ to $C_4$ monovalent hydrocarbon groups make up no more than 30 mole % of X, and
   (c) 5 to 200 parts by weight inorganic filler; according to the following steps:
     step (1) in which 20 to 70 weight % of the total amount of component (a) is mixed with component (b) in which $R^1$ is a saturated monovalent hydrocarbon group,
     step (2) in which component (c) is added and mixed into the mixture prepared in step (1),
     step (3) in which 30 to 80 weight % of the total amount of component (a) is mixed with component (b) in which $R^1$ is vinyl, and
     step (4) in which the mixture prepared in step (3) is mixed into the mixture prepared in step (2).

2. The method for the preparation of a one-package room-temperature-curable silicone composition according to claim 1, in which the inorganic filler is a hydrophilic or hydrophobic silica micropowder with a BET specific surface of at least 50 m²/g.

3. The method for the preparation of a one-package room-temperature-curable silicone composition according to claim 1, in which no more than 50 weight % of the organosilane mixture of component (b) is an organosilane in which $R^1$ is vinyl.

4. The method for the preparation of a one-package room-temperature-curable silicone composition according to claim 1, further comprising a component (d) in an amount of 0.005 to 2 parts by weight of a curing catalyst per 100 parts by weight of component (a) and optionally a component (e) in an amount of no more than 10 parts by weight of an amino-functional silane containing 2 to 3 hydrolyzable groups per molecule and an amino group bonded to silicon across a $C_1$ to $C_6$ divalent hydrocarbon group or the siloxane derivative of the amino-functional silane.

5. The method for the preparation of a one-package room-temperature-curable silicone composition according to claim 4, further comprising adding component (d) and optionally component (e) during the mixing of (c) with the mixture from step (1) or after the completion of the mixing process in step (2) and prior to step (4).

6. The method for the preparation of a one-package room-temperature-curable silicone composition according to claim 4, further comprising adding component (d) and optionally component (e) in step (4) at the same time as the mixture prepared in step (3).

7. The method for the preparation of a one-package room-temperature-curable silicone composition according to claim 4, further comprising adding component (d) and optionally component (e) after the completion of mixing in step (4).

8. The method for the preparation of a one-package room-temperature-curable silicone composition according to claim 1, where the mixing of steps (1) to (4) is conducted in a sealed continuous mixing device.

* * * * *